US006629652B2

(12) United States Patent  
Batten

(10) Patent No.: US 6,629,652 B2  
(45) Date of Patent: Oct. 7, 2003

(54) KITCHEN SINK DISPOSER MOUNT FOR SPACE CONSERVATION

(75) Inventor: William C. Batten, Asheboro, NC (US)

(73) Assignee: Clearline Systems, Inc., Asheboro, NC (US)

( * ) Notice: Subject to any disclaimer, the term of this patent is extended or adjusted under 35 U.S.C. 154(b) by 0 days.

(21) Appl. No.: 09/920,473

(22) Filed: Aug. 1, 2001

(65) Prior Publication Data

US 2003/0025015 A1 Feb. 6, 2003

(51) Int. Cl.[7] ............................................. B02C 18/42
(52) U.S. Cl. ..................... 241/24.11; 241/27; 241/36; 241/46.013; 241/DIG. 38
(58) Field of Search ........................ 241/24.11, 27, 241/36, 46.013, 46.014, 46.015, 46.016, DIG. 38

(56) References Cited

U.S. PATENT DOCUMENTS

| | | | |
|---|---|---|---|
| 2,894,631 A | 7/1959 | Levit et al. .................. 210/152 |
| 3,210,014 A | 10/1965 | Nauman et al. | |
| 3,823,879 A | * 7/1974 | Johnson .................... 241/101.2 |
| 4,051,024 A | 9/1977 | Lowe et al. .................. 210/30 |
| 4,059,531 A | 11/1977 | Tardivel ...................... 210/522 |
| 4,111,806 A | 9/1978 | Wright et al. ................ 210/115 |
| 4,145,287 A | 3/1979 | Walker et al. ............... 210/104 |
| 4,235,726 A | 11/1980 | Shimko ........................ 210/523 |
| 4,268,396 A | 5/1981 | Lowe .......................... 210/670 |
| 4,462,915 A | 7/1984 | Fridman ...................... 210/765 |
| 4,487,553 A | 12/1984 | Nagata ........................ 417/171 |
| 4,636,308 A | 1/1987 | Summers ................... 210/195.1 |
| 4,651,762 A | 3/1987 | Bowden ...................... 134/111 |
| 4,761,235 A | 8/1988 | Haentjens | |
| 4,816,146 A | 3/1989 | Schertler .................... 210/104 |
| 4,848,381 A | 7/1989 | Livingston et al. ............ 134/57 |
| 4,917,311 A | 4/1990 | Yoshino et al. ................ 241/36 |
| 4,998,548 A | 3/1991 | Lagerstrand ................. 134/111 |
| 5,021,153 A | 6/1991 | Haws ........................ 210/221.2 |
| 5,030,357 A | 7/1991 | Lowe .......................... 210/669 |
| 5,091,088 A | 2/1992 | Essop ......................... 210/536 |
| 5,116,516 A | 5/1992 | Smisson ...................... 210/747 |
| 5,127,417 A | 7/1992 | Tromblee et al. ........... 134/111 |
| 5,127,587 A | * 7/1992 | Johnson ................. 241/46.013 |
| 5,308,000 A | 5/1994 | Riley | |
| 5,335,866 A | 8/1994 | Narao .................... 241/46.013 |
| 5,360,555 A | 11/1994 | Batten ........................ 210/803 |
| 5,422,019 A | 6/1995 | Carman ...................... 210/787 |
| 5,492,619 A | 2/1996 | Batten | |
| 5,505,861 A | 4/1996 | Hirs .......................... 210/521 |

(List continued on next page.)

OTHER PUBLICATIONS

Photocopy of Big Dipper Thermaco brochure; copyright 1998.

Penberthy, Multiview Liquid Level Meter, Information from the internet, copyright 2000.

Anver, Vacuum Pumps and Vacuum Generators, Information from the internet, copyright 2000.

Heavy duty pneumatic conveyor, information from the internet, undated.

Primary Examiner—John M. Husar  
(74) Attorney, Agent, or Firm—MacCord Mason PLLC

(57) ABSTRACT

A food disposal system for installation on a drain of a commercial kitchen sink enables segregation of oil/grease from effluent flows from the drain. A housing collects effluent flows containing water, oil/grease, and solids from the drain, and a macerating pump has an inlet connected to an opening of the housing that is other than downwardly directed and an outlet connected to a sanitary drain. A greasy water outlet extends to an oil/grease separator from an outlet on the housing above the macerating pump inlet, and a hot water backflush source enables hot water to flow into the housing.

35 Claims, 8 Drawing Sheets

U.S. PATENT DOCUMENTS

| | | |
|---|---|---|
| 5,705,055 A | 1/1998 | Holloway et al. |
| 5,714,069 A | 2/1998 | Sager |
| 5,795,478 A | 8/1998 | Hirs .......................... 210/521 |
| 5,861,098 A | 1/1999 | Morrison |
| 5,948,258 A | 9/1999 | Daugherty ................. 210/513 |
| 5,951,878 A | 9/1999 | Astrom ...................... 210/791 |
| 6,007,006 A | 12/1999 | Engel et al. ........... 241/46.014 |
| 6,045,709 A | 4/2000 | Roberts ...................... 210/803 |
| 6,083,384 A | 7/2000 | Al-Ali ........................ 210/175 |
| 6,135,374 A * | 10/2000 | Hansen et al. .............. 241/100 |
| 6,168,723 B1 | 1/2001 | Moody ....................... 210/774 |
| 6,261,446 B1 | 7/2001 | Cornick |
| 6,261,462 B1 | 7/2001 | Batten |
| 6,368,501 B1 | 4/2002 | Batten |

* cited by examiner

KITCHEN SINK DISPOSER MOUNT FOR SPACE CONSERVATION

BACKGROUND OF THE INVENTION

The present invention relates to improvements in facilities for maintaining drains in commercial kitchens. This application contains certain subject matter in common with application Ser. No. 09/843,302 filed Apr. 25, 2001 now pending, the entire disclosure of which is hereby incorporated by reference.

In cooking environments, various items are discharged into a drain, not the least of which is grease, a by-product from cooking and washing. Grease in particular can be a source of problems, because when it cools, it can congeal and solidify, forming a solid having the capability of blocking or constricting the drain. Such grease blockage can build up over time, so it does not usually represent a discrete blockage event, but rather an accretion of congealed grease on the insides of the drains that, over time, narrows the flow path through the drain. This leads to the possibility of slow flow and, more particularly, to a possible blockage caused by a small article that would not block an unrestricted drain.

In addition, grease/water mixtures disposed directly into sewer lines burden municipal sewage systems since the grease builds up in sewer lines and on equipment in sewage treatment plants. To offset maintenance costs resulting from direct grease discharges into municipal sewers, municipal authorities assess surcharges against commercial food preparation operations that directly discharge grease/water mixtures.

Most food disposal installations in commercial kitchens involve a pre-rinse station in the dishwashing area. Dishes arriving from the dining area are first brought to the pre-rinse station where the food solids are rinsed into the pre-rinse sink and drain into the food disposal. Currently available technology does not provide for the separation of grease and oils prior to maceration by the food disposal unit. These flows frequently harbor high levels of fats (from salad dressings, butter, margarine, and fatty food scraps). As a result, food disposals are banned from commercial usage in numerous cities in the USA and around the world.

The advantages of garbage/food disposals are well known, so that the banning of such equipment brings additional problems of waste disposal, hygiene, and sanitation to commercial kitchen operations. Such operations need a solution to the problem of complying with sewer district needs while avoiding these untoward consequences.

Another problem that the commercial kitchens have is a lack of room under the sink for much equipment to extend downwardly below the drain of the sink. The normal location for a food disposer is that location. A need has arisen for improvement of space usage under the sink, while providing the other advantages of the oil/grease separation from the effluent flowing from the sink drain.

SUMMARY OF THE INVENTION

The present invention fulfills this need in the art by providing a food disposal system for installation on a drain of a commercial kitchen sink including a housing for collecting effluent flows containing water and solids from the drain, an opening from the housing other than downwardly when the housing is mounted to the drain, a macerating pump having an inlet connected to the opening of the housing and having an outlet connected to a sanitary drain, and a controller for effecting the operation of the macerating pump.

A preferred embodiment also includes a greasy water outlet from the housing extending to an oil/grease separator and located above the opening, a hot water backflush source discharging into the housing for enabling hot water to flow into the housing, and a sensor for sensing an accumulation of oil/grease in the housing.

Typically, a screen is interposed between the outlet and the housing. The hot water backflush source directs hot water to melt congealed grease on the screen.

The housing may include a chute to deflect water and solids entering the housing laterally, the macerating pump inlet may be located below a chute bottom, and the outlet to the sanitary drain may include a channel extending upwardly from the macerating pump.

The oil/grease separator may include a further macerating pump to macerate solids that may travel to the oil/grease separator.

The controller may be a timed controller that effects controlled operation of the hot water backflush. The controller may effect operation of the hot water backflush when the sensor senses an accumulation of oil/grease in the housing. The controller may effect sequenced operation of the hot water backflush and macerating pump in response to the sensor sensing an accumulation of oil/grease in the housing. Desirably, the greasy water outlet defines a static water level, and the sensor is located in the outlet above the static water level so that it senses a raised water level caused by an accumulation of oil/grease. The outlet to the sanitary drain may include a channel extending upwardly to define a secondary static water level, with the sensor located below the secondary static water level. The controller may actuate the hot water backflush followed by the macerating pump. A preferred embodiment also includes a cold water source actuable to introduce cold water into the housing when the macerating pump is operated.

The controller may be an operator-actuable switch. The backflush and macerating pumps may be actuated for preset times. Alternatively, the hot water backflush continues until a sensor indicates accumulated oil/grease has diminished.

Desirably, the opening from the housing to the macerating pump is oriented upwardly so that water and solids are drawn upwardly when the pump is operated.

The invention also provides a fitting for installation on a drain of a commercial kitchen sink to enable segregation of oil/grease from effluent flows from the drain including a housing adapted for collecting effluent flows containing water, oil/grease, and solids from the drain, an upwardly oriented opening on the housing adapted to be connected to a macerating pump, a greasy water outlet on the housing above the opening adapted to be connected to an oil/grease separator, and a hot water backflush fitting adapted to be connected to a hot water source for enabling hot water to flow into the housing.

The invention also provides a method of segregation of oil/grease from effluent flows of a drain of a commercial kitchen sink including draining the effluent flow containing water, oil/grease, and solids from a commercial kitchen sink to a housing below the sink, allowing separation of oil/grease from heavier components of the effluent flow to take place in the housing, directing segregated oil/grease and water from the housing to an oil/grease separator, and periodically operating a macerating pump having an inlet connected to the housing to macerate and pump the heavier components upwardly out of the housing and direct the heavier components to a sanitary drain maintaining a static water level at an elevation in the housing above the inlet to the macerating pump and wherein directing the oil/grease and water includes permitting gravitational flow of the oil/grease and water from the housing at the static water level. In the method the gravitational flow of the oil/grease and water may be from a height in the housing below a secondary static water level. The gravitational separation of components of the effluent flow may include permitting heavy solids to travel down a chute above the inlet to the macerating pump. Allowing separation of oil/grease from heavier components of the effluent flow may include screening solids from traveling with the oil/grease.

The method may also include periodically directing hot water flows into the housing to melt and loosen grease from the screen. The hot water may be directed into the housing when a water level sensor indicates a rising water level. The macerating pump may be operated after the hot water is directed into the housing. Cold water may be introduced into the housing when the macerating pump is operated.

The invention also provides a food disposal system for installation on a drain of a commercial kitchen sink to enable segregation of oil/grease from effluent flows from the drain including a housing for collecting effluent flows containing water, oil/grease, and solids from the drain, a macerating pump having an inlet connected to an upwardly directed opening of the housing and having an outlet connected to a sanitary drain, a greasy water outlet extending to an oil/grease separator from the housing above the macerating pump inlet to enable oil/grease and water to exit the housing, means for maintaining the flow of oil/grease and water through the greasy water outlet, and means for effecting the operation of the macerating pump.

BRIEF DESCRIPTION OF THE DRAWINGS

The invention will be better understood by a reading of the Detailed Description of the Preferred Embodiments along with a review of the drawings, in which.

DETAILED DESCRIPTION OF THE PREFERRED EMBODIMENT

The food disposal system segregates and extracts oil/grease from effluent flows containing solids prior to maceration and disposal of the solids by the disposer to a sanitary sewer. The invention's primary application is in commercial kitchen sinks, which includes virtually any kitchen sink other than a residential unit, although the invention may have applicability in residences. The apparatus of the first embodiment includes: 1) an inlet case for collecting a waste stream containing water, oil/grease, and solids from a kitchen drain; 2) a macerating pump (conventionally referred to as a garbage disposer) having an inlet connected to an opening on the bottom of the inlet case and having a solids/water outlet pipe connected to a sanitary drain; 3) a greasy water outlet pipe extending from an outlet opening on a sidewall of the inlet case near the top of the inlet case to an oil/grease separator; 4) a solids blocking screen in the entrance to the outlet pipe from the inlet case; 5) a hot water backflush system directed onto the screen; 6) a cleaning cycle sensor in the solids/water outlet pipe for sensing the level of accumulated wastes in the inlet case; and 7) a controller connected to the sensor for controlling the sequenced operation of the hot water backflush system and macerating pump.

Wastewater accumulates in the inlet case until it reaches the static water level height defined by the bottom of the gray water outlet pipe. Heavy solids sink to the bottom, and floating solids and oil/grease rise to the top surface. When a sufficient quantity of waste fills the inlet case to rise to a higher level (due to blockage of the gray water outlet by congealed oil/grease), the cleaning cycle sensor in the solids/water outlet pipe is triggered. The disposal cycle begins with activation of the hot water backflush, which cleans blockage of the screen caused by accumulated oil/grease or solids. With the screen clear, the floating oil/grease and some water is free to drain from the inlet case through the greasy water outlet. After a set period of time, the controller activates the macerating pump, which grinds any large solids and discharges the solids/water mixture remaining in the inlet case out through the solids/water outlet pipe to the sanitary sewer.

Figure 1:
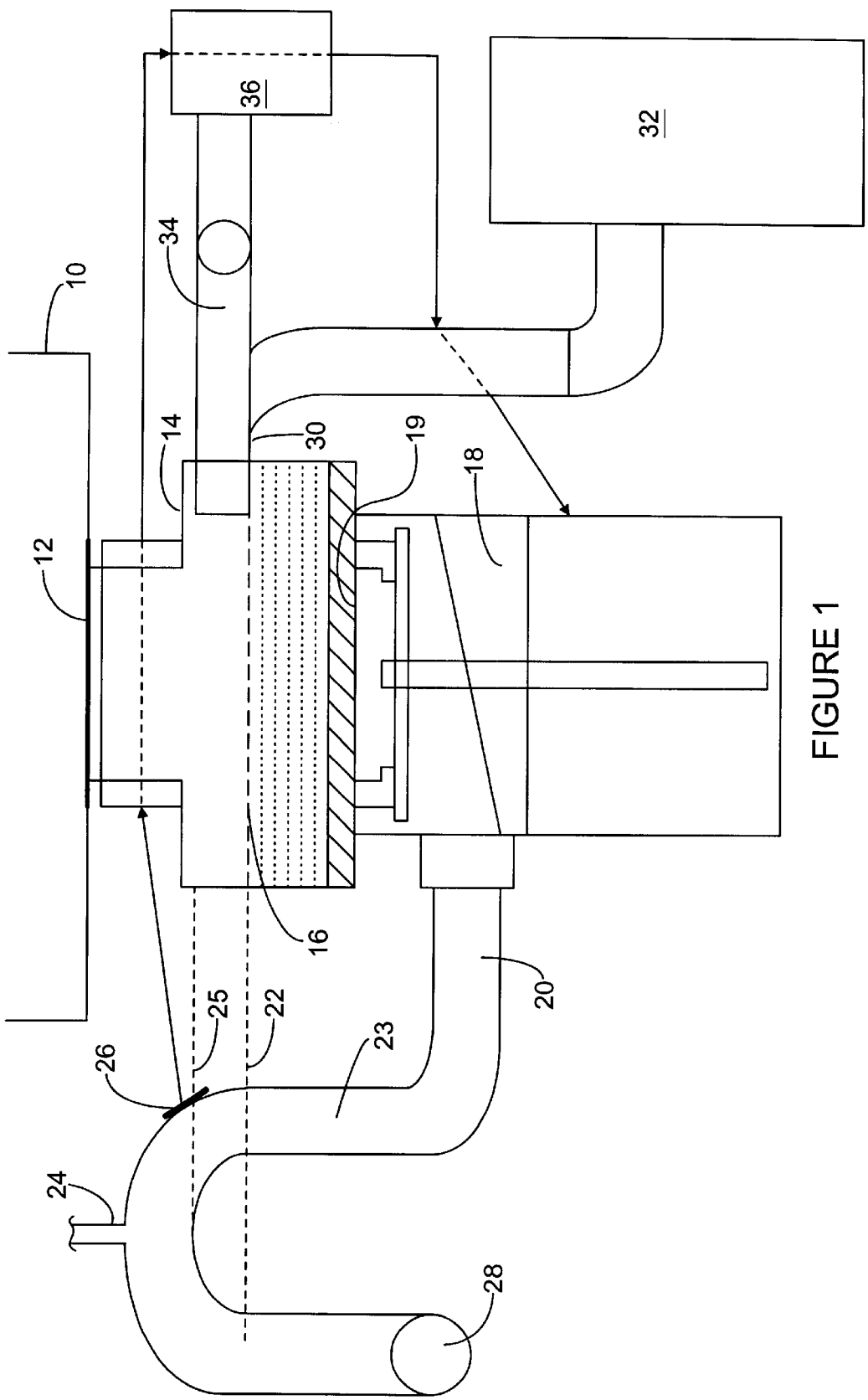
FIG. 1 is an elevational schematic view of a commercial kitchen sink equipped with apparatus according to a first embodiment of the invention.
Figure 2:
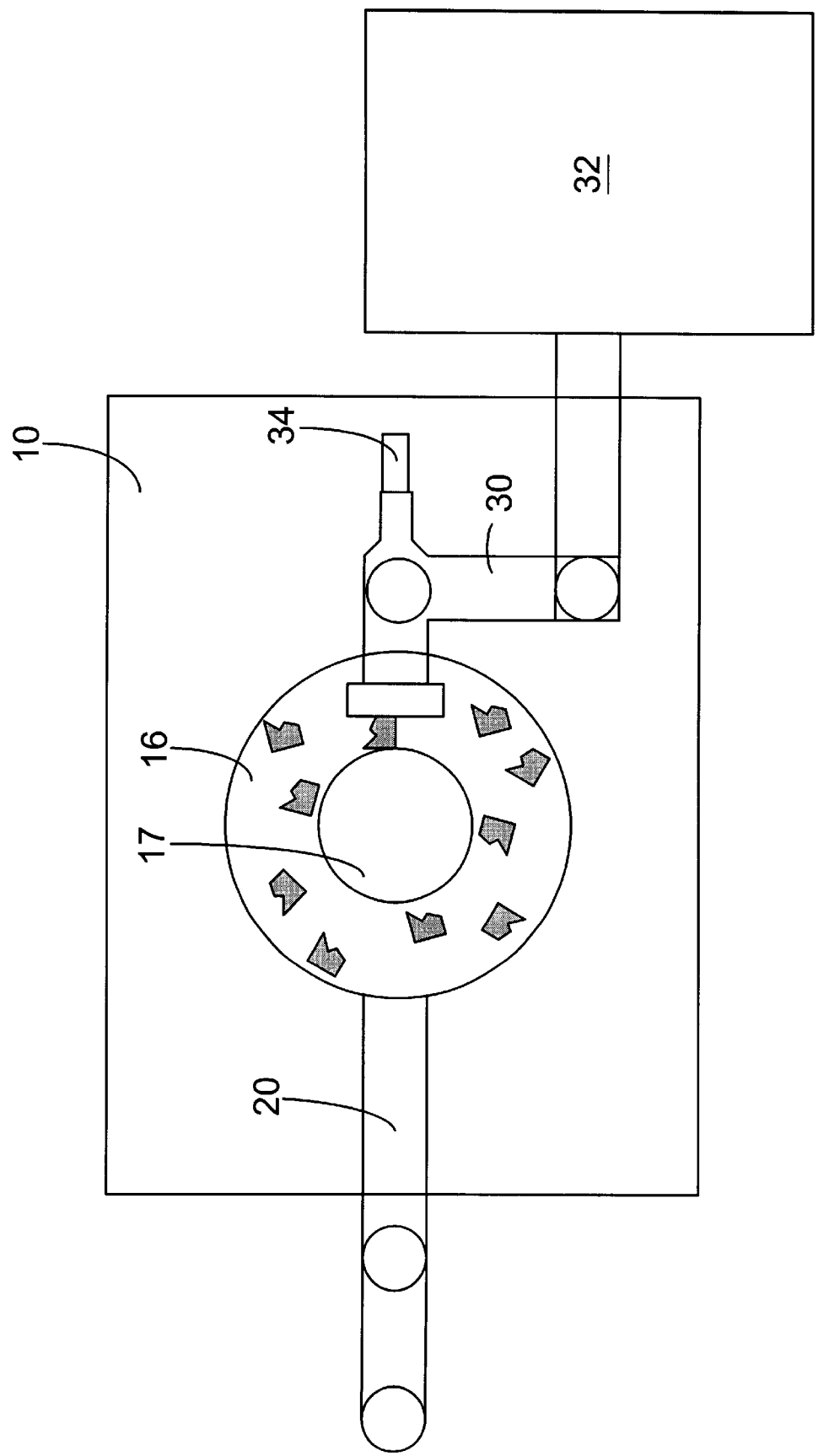
FIG. 2 is a bottom schematic view of the embodiment of FIG. 1.

As seen in FIG. 1, a commercial kitchen sink 10 has, as is conventional, a lower drain 12 through which the contents of the sink 10 discharge under the force of gravity. In the embodiment of FIG. 1, mounted on the bottom side of the sink is an inlet case or housing 14 defining a holding chamber for the effluent discharged through drain 12. A screen 16 is provided about two-thirds of the way up the housing 14 with a central hole 17, as seen in FIG. 2. The central hole permits solids and other materials to flow from the drain 12 to the bottom of the inlet case 14.

A greasy water outlet 30 is provided just above the screen 16 and leads downwardly to a grease separator 32. The grease separator 32 can be any suitable separator for separating kitchen oil and grease from water. A particularly preferred separator is a Big Dipper® separator from Thermaco, Inc. of Asheboro, N.C. Aligned with the outlet 30 is a hot water backflush port 34 controlled by a valve controller and valve 36. The controller also can have an input to control the motor of the macerating pump 18. The bottom of outlet 30 defines the normal static water level 22.

Mounted to the bottom of the housing 14 is a macerating pump 18. The macerating pump 18 can be any conventional food or waste disposer which has heretofore been known or may later be developed for these purposes. It has the function of grinding solids and pumping them along with a flow of water from an inlet 19 to an outlet 20. The outlet 20 connects through a riser pipe 23 to lead to the sanitary drain 28. The riser pipe 23 defines a secondary static water level to be at the lower-most point of the pipe's upper bend 25, which can be reached if there is a prolonged blockage to outlet 30. If desired, a vent 24 can be provided at the top of the riser pipe, and this may be needed to comply with building code requirements. A sensor 26 is provided above the static water level 22 to indicate if the water level rises above its normal static level. This thereby provides an indication of the accumulation of oil/grease on the screen in the housing.

The inlet case 14 collects heavy solids at the bottom of the casing just above the macerating pump 18, with gray water on top of that. Lighter components, such as floating solids and oil/grease, can float to the top of the gray water as the effluent has a residence time in the inlet case 14. As long as the macerating pump 18 is off, the heavy solids will remain in the inlet case 14, although the gray water passes through the heavy solids and out through the discharge pipe 20 to the sanitary drain.

In operation, as dishes are pre-rinsed in sink 10, water flushes solid food components and particles, as well as grease, from the plates and other dishes through the drain 12 into the inlet case 14. The heavy solids settle to the bottom of the inlet case, and the case accumulates gray water. Grease, oil, and light solids tend to float on the gray water to the height of the greasy water outlet 30, from which they drain to the grease separator 32 for separation of grease from the water. The separated water can then be discharged to a sanitary drain, with the grease saved for processing or other appropriate disposal. If other floating solids travel through the outlet 30 along with the grease, they can be handled in conventional fashion, such as by the use of a grease separator 30 equipped with a macerator of its own, such as is disclosed in U.S. Pat. No. 5,360,555, which issued Nov. 1, 1994 to William C. Batten and was assigned to Clearline Systems, Inc. The entire disclosure of that patent is incorporated herein by reference. Alternatively, the separator disclosed in U.S. Pat. No. 6,261,462 entitled Combination Pump and Separator, Especially For Commercial Kitchens, may be used. The entire disclosure of that patent is incorporated herein by reference.

The presence of the screen 16 minimizes the solids inflow to the grease separator 32. However, screen 16 may also attract grease that may congeal upon the screen and, ultimately, blind the screen, preventing the grease and gray water from exiting through the greasy water outlet 30. If this is the case, the water level will build up to the point where the top of the water level in the outlet pipe 20 is above normal, i.e., progressing toward the secondary static water level 25, which is sensed by the cleaning cycle sensor 26. Upon the cleaning cycle sensor 26 sensing the rise in water level, the controller 36 opens the hot water valve to the hot water backflush port 34 to introduce hot water to the screen 16. The heat of the hot water melts the grease, thus unblinding the screen. Preferably, the screen is formulated of a wedge wire arrangement so as to minimize the chance of solids blinding, but the reverse flow of the hot water through the port 34 further flushes away any entrained or entrapped solids. The hot water can continue until the water level sensor 26 no longer senses the raised water level, indicating the freeing of the screen 16. Alternately, the hot water can continue to flow for a preset period of time.

Once the hot water has ceased, the controller 36 turns on the macerating pump 18 for a preset period of time so that the pump grinds the solids that are just above its inlet in the housing 14, macerating them and blending them with influent gray water and discharging them through the outlet 20. The operation of the pump 18 can be for a preset period of time or triggered to stop in response to a sensed condition. Having the pump operate just after the hot water flow to the screen minimizes the amount of oil/grease that will pass through the macerating pump 18 to the sanitary drain 28.

Figure 3:
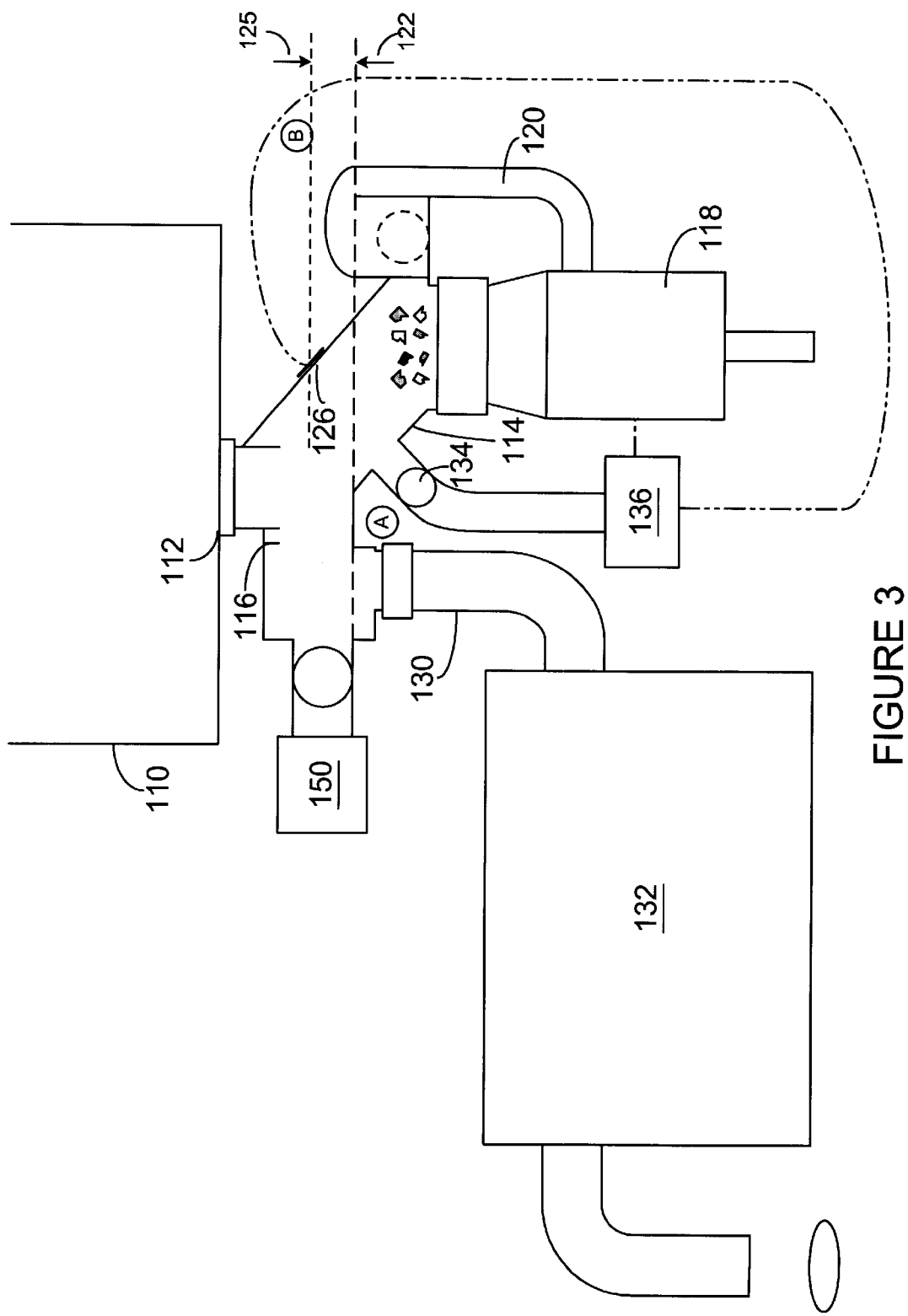
FIG. 3 is an elevational schematic view of a commercial kitchen sink equipped with apparatus according to a second embodiment of the invention.

Turning now to FIG. 3, another embodiment is disclosed. Here like parts will be referred to by similar reference numerals, augmented by 100. In FIG. 3, sink 110 drains through drain 112 into a housing 114 configured as a chute. The lower end of the chute 114 terminates in an opening to macerating pump 118 which discharges through an outlet 120. The housing 114 also leads to the greasy water outlet 130 to a separator unit 132, like separator 32 above. A screen 116 of ½" gap bars prevents large solids from passing through the outlet 130. The outlet 130 also defines the normal static water level 122. A riser configuration on outlet 120 defines a possible second static water level 125. Variations in the water above level 122 can be sensed by water level sensor 126. A hot water backflush 134 is provided in the chute to introduce hot water to the chute to help raise the temperature and maintain the grease in a flowable condition.

In operation, the water, oil/grease, and solids discharge downwardly from the sink 110 through the drain 112 into the chute 114. The chute 114 has a fairly substantial size so that the solids, which are typically heavier than water, will fall down the chute to the macerating pump 118. The oil/grease rises to the top of the chute and passes through screen 116 for discharge downwardly through the pipe 130 to the separator 132. At such time that the water level reaches a backed-up level because of solids and grease accumulation on screen 116, the sensor 126 senses such increased level and signals the controller 136 to inject hot water through the hot water backflush 134 to help liquefy any grease and frees up the screen 116. Following the hot water injection, the macerating pump 118 is operated, which grinds the solids which have accumulated at the inlet of the macerating pump and drives them toward the sanitary drain through the outlet 120. When the controller 136 actuates pump 118, it also opens a valve 150 for a cold water port to supply cold water to the macerator to provide the solids flowability through the pump 118 and discharge pipe 120. When the pump 118 is halted by the controller, the cycle can resume. Again, the macerating pump is not activated until substantially all of the oil/grease has left the chute 114.

Figure 4:
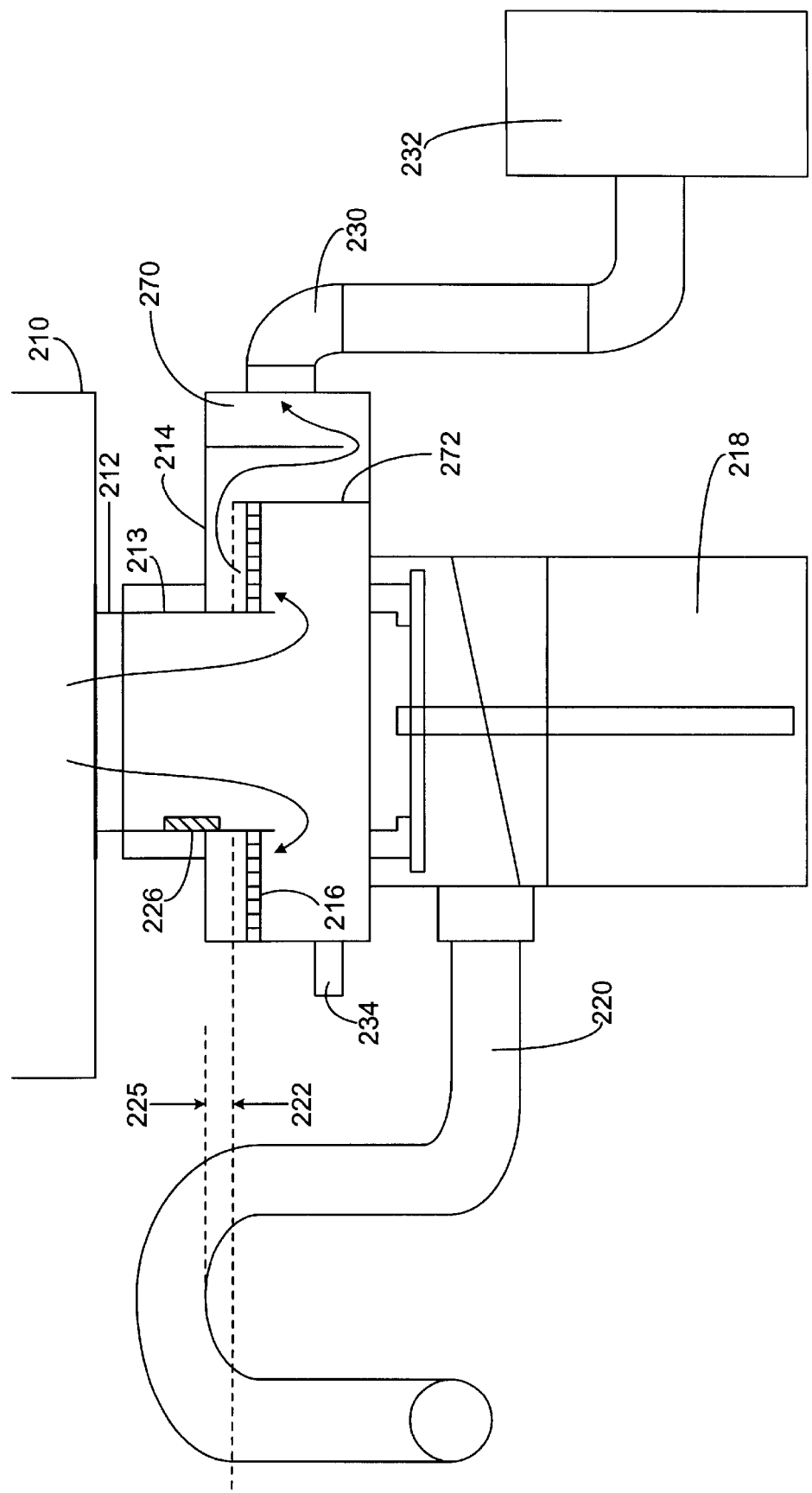
FIG. 4 is an elevational schematic view of a commercial kitchen sink equipped with apparatus according to a third embodiment of the invention.
Figure 5:
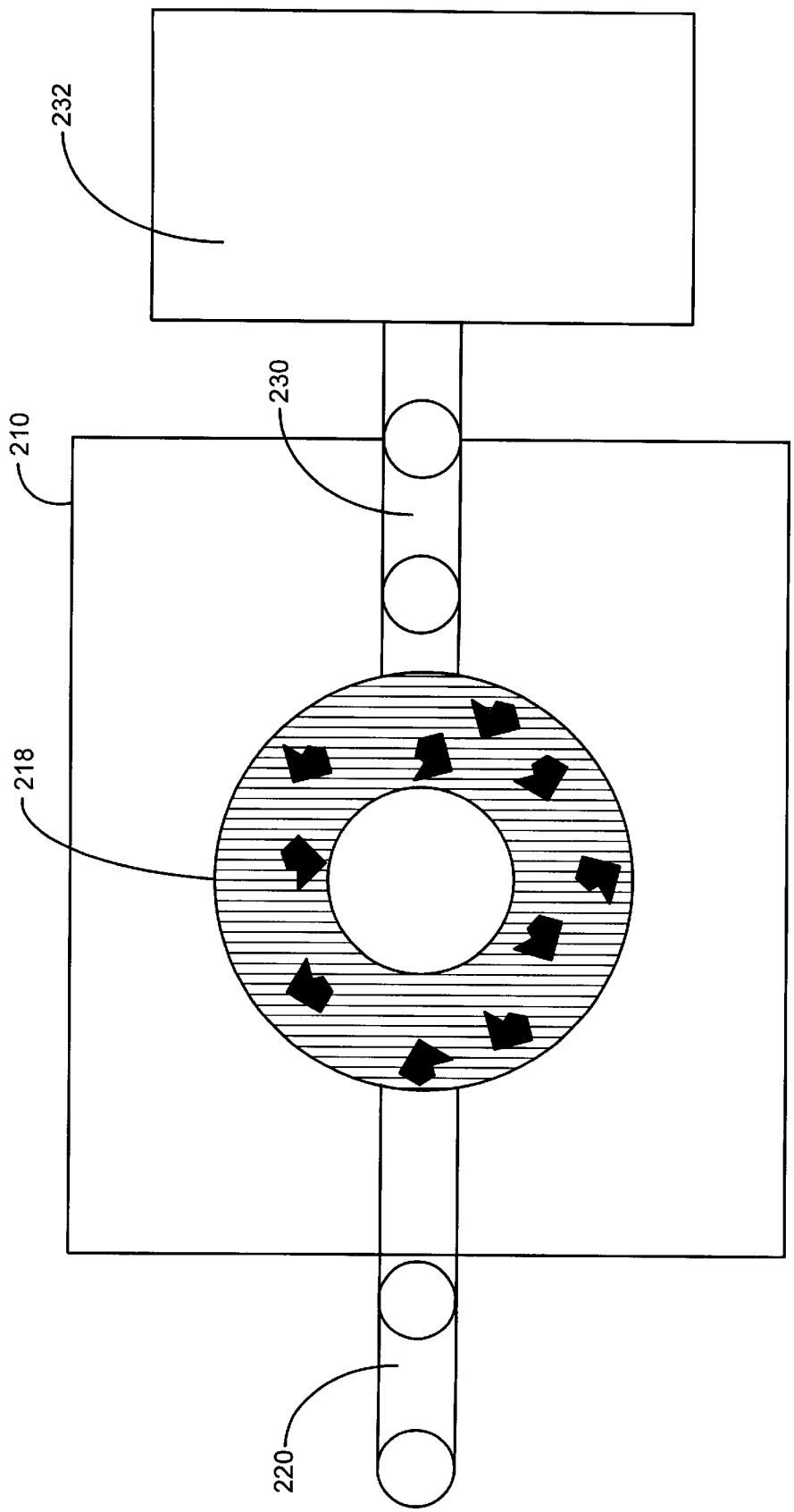
FIG. 5 is a bottom schematic view of the embodiment of FIG. 4.

FIGS. 4 and 5 show a third embodiment of the present invention. Once again, like components will be referred to by similar numbers, augmented by an additional 100. In this case, the sink 210 drains through drain 212 into a housing 214 provided with an annular screen 216. Drain 212 includes a cylindrical sleeve 213 preventing any flow above the screen 216 except for that which passes from below the screen. A running gas trap assembly 270 interposed between the housing 214 and the greasy water outlet 230 includes a weir 272 that defines the static water level 222. In the event that the screen becomes blinded so water cannot exit through the screen, the water level will build up in the outlet 220 to a new static water level 225 defined by the outlet pipe 220. The cleaning cycle sensor switch 226 detects the rising water level and opens a valve to inject water through hot water backflush port 234 into the housing 214. The hot water serves to melt grease which may have adhered to the screen 216 to permit the resumed flow of oil/grease and water through the greasy water outlet 230 to the grease separator 232. The controller, after turning off the hot water backflush port 234, then turns on the macerating pump 218 to grind and discharge through outlet 220 the solids and gray water which have accumulated in the housing 214, substantially free of oil/grease.

Figure 6:
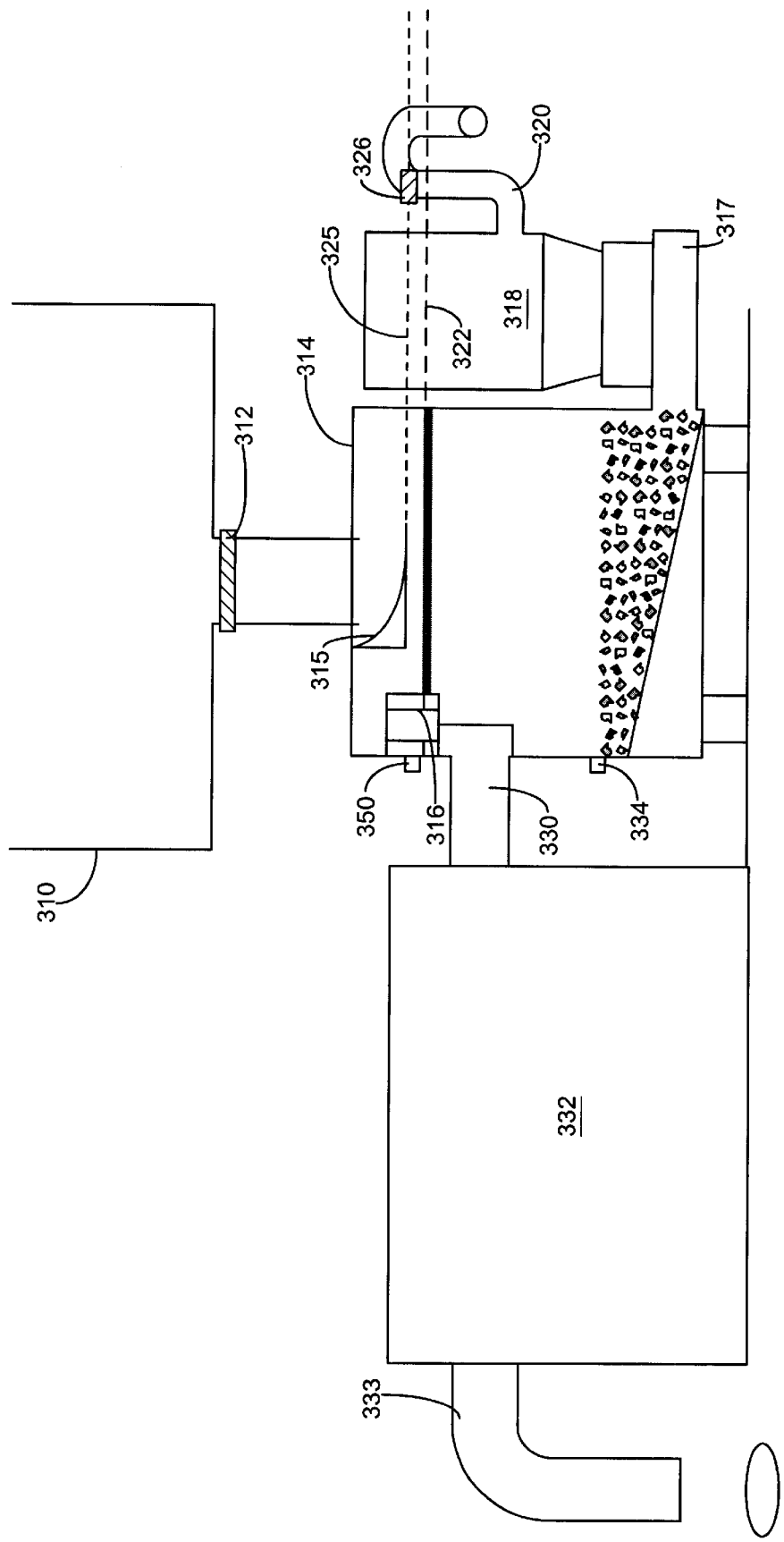
FIG. 6 is an elevational schematic view of a commercial kitchen sink equipped with apparatus according to a fourth embodiment of the invention.
Figure 7:
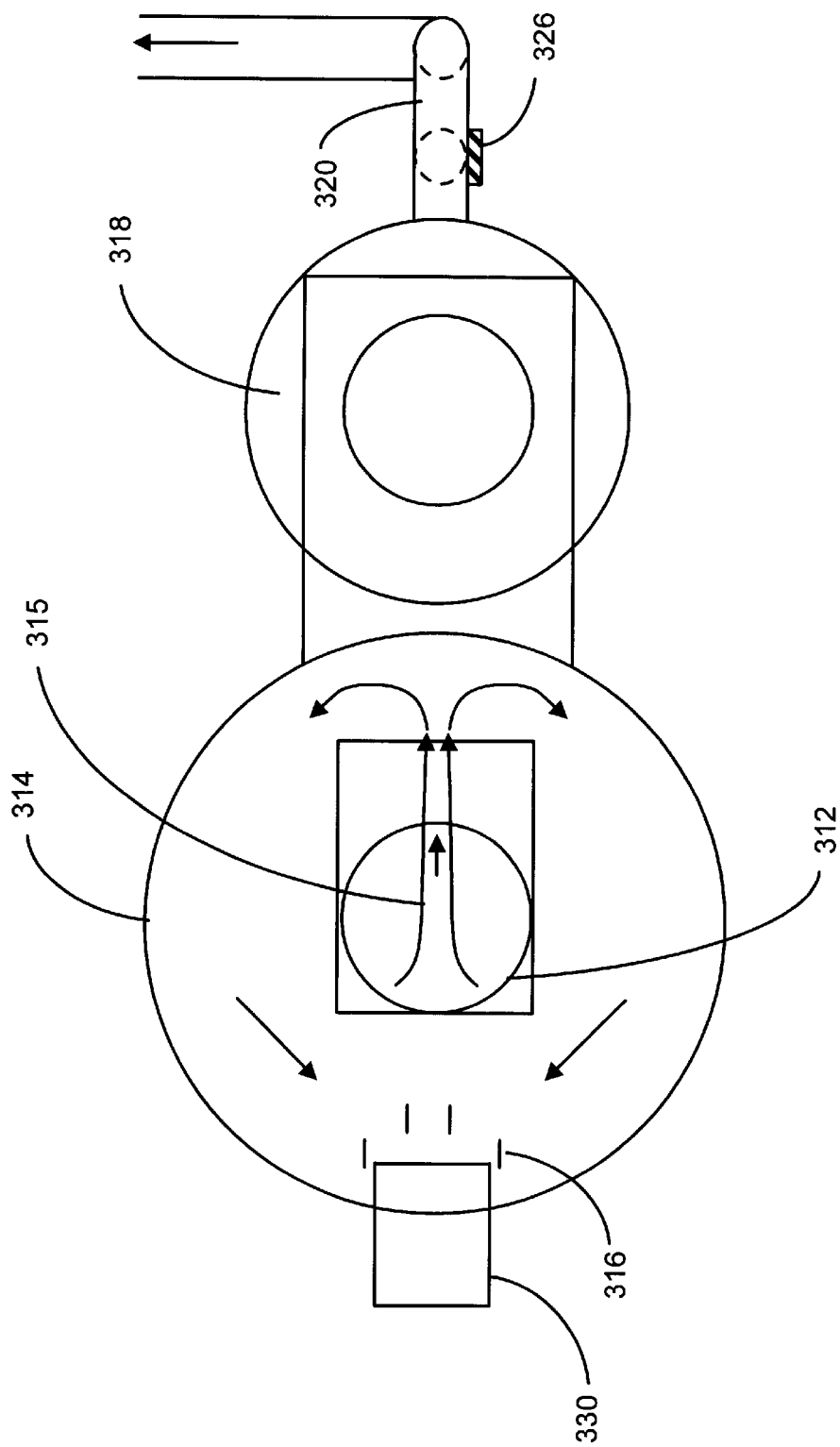
FIG. 7 is a bottom schematic view of the fourth embodiment.

FIGS. 6 and 7 show a fourth embodiment which is particularly adapted for efficient use of under-sink space. As can be seen, housing 314 is provided mounted next to the macerating pump 318, so that the two are side by side. This permits more use of the vertical space below the sink 310, without crowding.

In the embodiment shown in FIG. 6, the sink 310 drains through a drain 312 for discharge of water, solids and oil/grease into a housing 314. The top of the housing 314 is provided with a laterally deflecting chute or baffle 315 to cause the effluent to be directed laterally for discharge into the main part of the housing 314. The housing 314 has a projecting channel 317 with an upwardly facing opening connecting to the downwardly facing inlet to the macerating pump 318. The macerating pump 318 has a discharge line 320 connected through a riser pipe defining a secondary static water level 325. Just below the water level 325 is a sensor 326 detecting a water level rising to the static water level 325.

A greasy water outlet 330 connected to the housing 314 directs greasy water to a oil/grease separator 332 which removes the grease and oil from the water so that the latter can be discharged through a clean gray-water discharge line 333. A hot water flush port 334 is provided to have controllable, selective inputs of hot water into the housing 314.

The opening from the housing 314 to the greasy water discharge line 330 is protected by screen 316 to prevent large solids from exiting through the greasy outlet line 330. A cold water flush port 350 is located behind the screen 316. The outlet to the greasy water discharge line 330 acts as a weir to define a primary static water level 322.

In operation, as the solids, oil/grease and water drain from the sink 310 through the drain 312, they accumulate in the housing 314. Heavy solids drop to the bottom of the housing 314, and oil/grease floats to the top and drains out through the greasy water discharge line 330 along with water, as additional water is discharged into the housing 314. The screen 316 prevents large solids from passing through discharge line 330.

The oil/grease is removed from the greasy water discharge in the separator 332 in accordance with any of the techniques outlined above. If the grease congeals on the surface of the water in the housing 314 so as to cause a blockage of the screen 316, then water will not discharge through the discharge line 330 but rise in the housing 314, the macerating pump 318 and its discharge line 320. This rise in water level will continue until detected by the sensor 326. At this time, the hot water discharge port 334 will be actuated to discharge hot water into the housing 314 to heat the body of water in the housing 314 and therefore cause the melting of the grease which has otherwise clogged screen 316. This restores the screen to a free flowing condition so that the water can again drain through the discharge line 330 and thus reduce the water level back to the static water level 322.

The macerating pump 330 can be actuated as desired to macerate and pump the solids and water from the housing 314 through channel 317 and discharge them through the discharge line 320 to a sanitary sewer or other desired sewage discharge.

Figure 8:
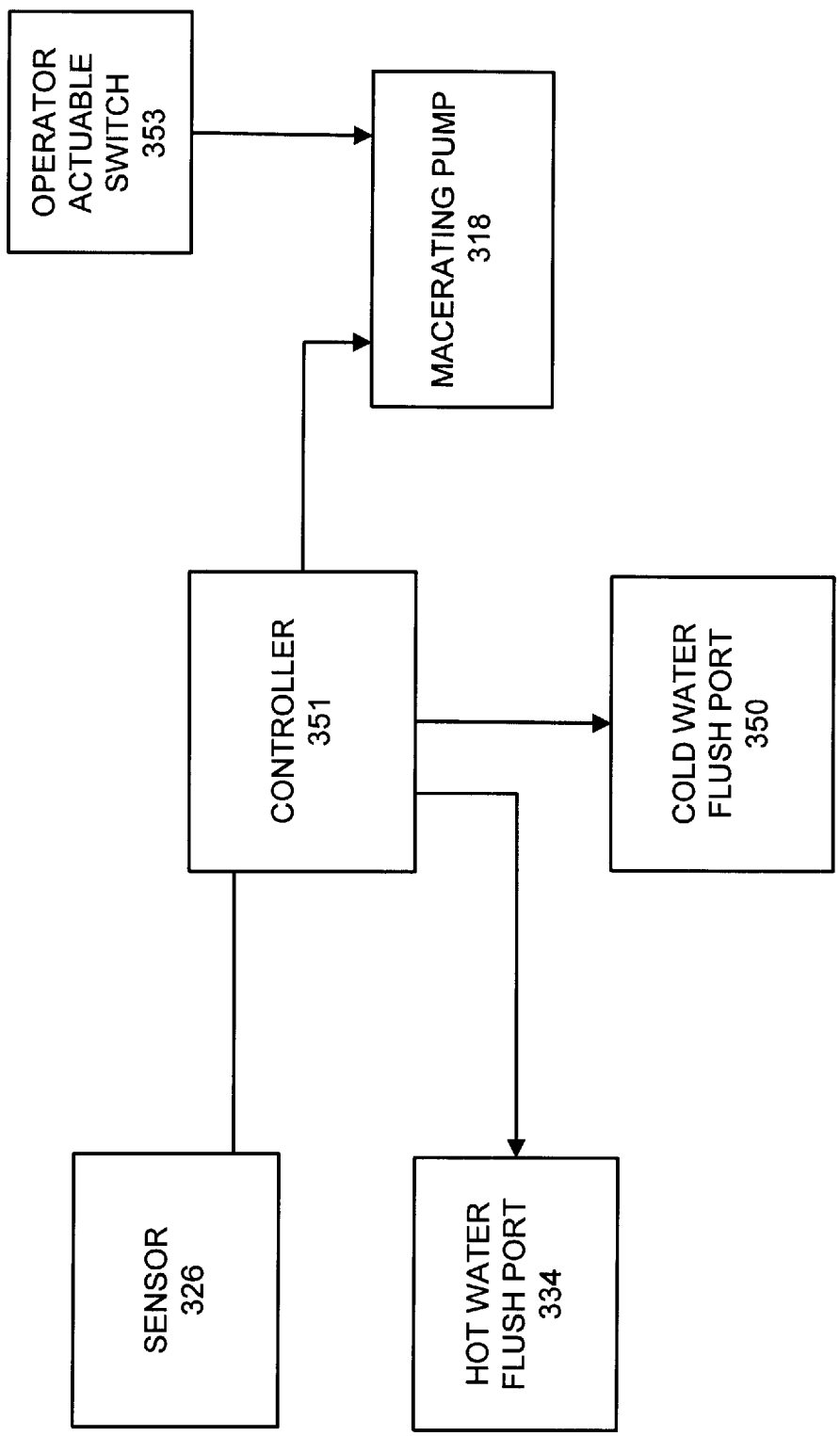
FIG. 8 is a block diagram of possible control systems for the fourth embodiment.

As seen in FIG. 8 the sequence of operation can be made automatic by a controller 351 which actuates the macerating pump 318 and the cold water flush port 315, simultaneously, once the static water level has dropped from the level 325 to level 322 sensed by sensor 326. As will be apparent, since this will have occurred shortly after a hot water flush, the top surface of the water in the housing 314 should be substantially free of oil/grease, assuring that very little oil or grease will be discharged through the discharge line 320. Alternatively, or in combination therewith, the operator can periodically actuate a switch 353 to operate the macerating pump 318. Alternatively, a timer can be provided to periodically operate the macerating pump 318 and cold water port 350 to clear solids from the housing 314 and its discharge channel 317.

As shown in FIG. 6 the macerating pump 318 is provided with a downwardly facing inlet, but those with ordinary skill in the art will appreciate that other orientations such as a horizontal mount or some other angled mount may also be provided. However, that it should be noted that the orientation of the macerating pump 318 in this embodiment is preferably not immediately below the housing 314 in order to minimize the height occupied by the components under the sink 310.

When the pump 318 is actuated, large floating solids which have been blocked from discharge through the discharge line 330 by the screen 316 will be drawn downwardly with the other water flow through the housing 314 and pumped and macerated by the pump 318 for discharge through the discharge line 320.

Mounting the hot water flush port 334 relatively low in the housing 314 enables the hot water to contact solids which may be located in the bottom of the housing and expose grease which may be adhered to the food solid to the heating action of the hot water, causing grease to be liberated from the solids, so that it can float upwardly toward the greasy water discharge outlet 330. In addition, because hot water normally rises, by introducing the hot water lower in the housing 314, the rising hot water heats the body of water in the housing 314 and promotes lifting of the heated water to the proximity of the screen 316 to permit melting.

Locating the cold water flush port outwardly from the screen 316 allows the cold water to be introduced at a relatively high rate (perhaps 5 to 7 gallons per minute) to forcibly dislodge any solids which may be adhered to the screen. The relatively high volume cold water flow is introduced when the macerating pump 318 is actuated to provide a substantial water flow to help to act as a liquid carrier for the macerated solids as they travel through the macerating pump 318 and out the discharge line 320.

Of course, other locations for the hot water and cold water inlets can be provided as desired.

Although these various embodiments have been described as having a controller which actuates the hot water flow followed by actuation of the macerating pump, other control methodologies can be implemented. For example, both functions can be performed with an operator-actuated on/off switch or valve control. One or both of the functions can also be performed on the basis of a timer which can be adjustable or not, as desired.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. A food disposal system for installation on a drain of a commercial kitchen sink comprising:

a housing for collecting effluent flows containing water and solids from the drain, an opening from the housing which faces a direction other than downward when the housing is mounted to the drain, a macerating pump having an inlet connected to the opening of the housing and having an outlet connected to a sanitary drain, a controller for effecting the operation of the macerating pump, and a hot water backflush source discharging into the housing for enabling hot water to flow into the housing.

2. A system as claimed in claim 1 further comprising:

a greasy water outlet from the housing extending to an oil/grease separator and located above the opening, and a sensor for sensing an accumulation of oil/grease in the housing.

3. A system as claimed in claim 2 further comprising a screen interposed between the outlet and the housing.

4. A system as claimed in claim 3 wherein the hot water backflush source directs hot water to melt congealed grease on the screen.

5. A food disposal system for installation on a drain of a commercial kitchen sink comprising:

a housing for collecting effluent flows containing water and solids from the drain, an opening from the housing which faces a direction other than downward when the housing is mounted to the drain, a macerating pump having an inlet connected to the opening of the housing and having an outlet connected to a sanitary drain, a controller for effecting the operation of the macerating pump, wherein the housing includes a chute to deflect water and solids entering the housing laterally, the macerating pump is located below a chute bottom and the outlet to the sanitary drain includes a channel extending upwardly from the macerating pump.

6. A system as claimed in claim 2 wherein the oil/grease separator includes a further macerating pump to macerate solids that may travel to the oil/grease separator.

7. A system as claimed in claim 2 wherein the controller is a timed controller, and effects controlled operation of the hot water backflush.

8. A system as claimed in claim 2 wherein the controller effects operation of the hot water backflush when the sensor senses an accumulation of oil/grease in the housing.

9. A system as claimed in claim 2 wherein the controller effects sequenced operation of the hot water backflush and macerating pump in response to the sensor sensing an accumulation of oil/grease in the housing.

10. A system as claimed in claim 9 wherein the greasy water outlet defines a static water level, and the sensor is located in the outlet above the static water level so that it senses a raised water level caused by an accumulation of oil/grease.

11. A system as claimed in claim 10 wherein the outlet to the sanitary drain includes a channel extending upwardly to define a secondary static water level, and the sensor is located below the secondary static water level.

12. A system as claimed in claim 2 wherein the controller is an operator-actuable switch.

13. A system as claimed in claim 1 further comprising a cold water source actuable to introduce cold water into the housing when the macerating pump is operated.

14. A system as claimed in claim 2 wherein the controller actuates the hot water backflush followed by the macerating pump.

15. A system as claimed in claim 14 wherein the backflush and macerating pumps are actuated for preset times.

16. A system as claimed in claim 14 wherein the backflush continues until a sensor indicates accumulated oil/grease has diminished.

17. A system as claimed in claim 14 wherein the backflush continues until a sensor indicates accumulated oil/grease has diminished and the macerating pump is then actuated for a preset time.

18. A food disposal system for installation on a drain of a commercial kitchen sink comprising:

a housing for collecting effluent flows containing water and solids from the drain, an opening from the housing which faces a direction other than downward when the housing is mounted to the drain, a macerating pump having an inlet connected to the opening of the housing and having an inlet connected to a sanitary drain, a controller for effecting the operation of a macerating pump, and the opening from the housing to the macerating pump is oriented upwardly so that water and solids are drawn upwardly when the pump is operated.

19. A food disposal system for installation on a drain of a commercial kitchen sink to enable segregation of oil/grease from effluent flows from the drain comprising:

a housing having a chute and a bottom and a top for collecting effluent flows containing water, oil/grease, and solids from the drain, a greasy water outlet extending to an oil/grease separator from an outlet on the housing located near the top of the housing to define a static water level, a macerating pump having an inlet connected to an upwardly facing opening at the bottom of the housing and having an outlet connected to a sanitary drain, a hot water backflush source for enabling hot water to flow into the housing, and a controller for effecting the operation of the hot water backflush source and the macerating pump.

20. A food disposal system for installation on commercial kitchen sinks to enable segregation of oil/grease from effluent flows comprising:

an inlet case for collecting a waste stream containing water, oil/grease, and solids from a kitchen drain, a macerating pump having an inlet connected to an opening near a bottom of the inlet case, the opening oriented upwardly when the case is mounted on the drain and having a solids/water outlet pipe connected to a sanitary drain, a greasy water outlet pipe extending from an outlet opening near a top of the inlet case to an oil/grease separator, a solids blocking screen in an entrance to the greasy water outlet pipe from the inlet case, a cold water source actuatable to introduce cold water into the housing, a hot water backflush system directed to provide hot water for melting solidified grease on the screen, a cleaning cycle sensor in the solids/water outlet pipe for sensing a raised water level indicating accumulated oil/grease on the screen, and a controller connected to the sensor for effecting the operation of the hot water backflush system followed by actuation of the cold water source and the macerating pump.

21. A fitting for installation on a drain of a commercial kitchen sink to enable segregation of oil/grease from effluent flows from the drain comprising:

a housing adapted for collecting effluent flows containing water, oil/grease, and solids from the drain, an upwardly oriented opening on the housing adapted to be connected to a macerating pump, a greasy water outlet on the housing above the opening adapted to be connected to an oil/grease separator, and a hot water backflush fitting adapted to be connected to a hot water source for enabling hot water to flow into the housing.

22. A fitting as claimed in claim 21 wherein the housing includes a chute with a bottom, with the opening below the chute bottom.

23. A method of segregation of oil/grease from effluent flows of a drain of a commercial kitchen sink comprising:

draining the effluent flow containing water, oil/grease, and solids from a commercial kitchen sink to a housing below the sink, allowing separation of oil/grease from heavier components of the effluent flow to take place in the housing, directing segregated oil/grease and water from the housing to an oil/grease separator, and periodically operating a macerating pump having an inlet connected to the housing to macerate and pump the heavier components upwardly out of the housing and direct the heavier components to a sanitary drain.

24. A method as claimed in claim 23 further comprising maintaining a static water level at an elevation in the housing above the inlet to the macerating pump and wherein directing the oil/grease and water includes permitting gravitational flow of the oil/grease and water from the housing at the static water level.

25. A method as claimed in claim 24 wherein the gravitational flow of the oil/grease and water is from a height in the housing below a secondary static water level.

26. A method as claimed in claim 23 wherein the gravitational separation of components of the effluent flow includes permitting heavy solids to travel down a chute above the inlet to the macerating pump.

27. A method as claimed in claim 23 wherein allowing separation of oil/grease from heavier components of the effluent flow includes screening solids from traveling with the oil/grease.

28. A method as claimed in claim 27 further comprising periodically directing hot water flows into the housing to melt and loosen grease from the screen.

29. A method as claimed in claim 28 wherein the hot water is directed into the housing when a water level sensor indicates a rising water level.

30. A method as claimed in claim 29 wherein the macerating pump is operated after the hot water is directed into the housing.

31. A method as claimed in claim 23 further comprising introducing cold water into the housing when the macerating pump is operated.

32. A method as claimed in claim 23 wherein the macerating pump is operated for a preset interval.

33. A method as claimed in claim 23 further comprising periodically introducing hot water into the housing to maintain oil/grease in a flowable state.

34. A method of segregation of oil/grease from an effluent flow of a drain of a commercial kitchen sink comprising:

draining the effluent flow containing water, oil/grease, and solids from a commercial kitchen sink to a housing below the sink, maintaining a static water level in the housing at an elevation above an inlet to a macerating pump, allowing gravitational separation of oil/grease from heavier components of the effluent flow to take place in the housing, including permitting heavy solids to travel down the housing to the inlet of a macerating pump, periodically introducing hot water into the housing to maintain grease in the effluent in a flowable state, directing oil/grease in the effluent from an upper elevation of the housing to an oil/grease separator, and periodically operating the macerating pump and introducing cold water into the housing to pump and macerate the heavier components and direct the heavier components upwardly or laterally out of the housing to a sanitary drain.

35. A food disposal system for installation on a drain of a commercial kitchen sink to enable segregation of oil/grease from effluent flows from the drain comprising:

a housing for collecting effluent flows containing water, oil/grease, and solids from the drain, a macerating pump having an inlet connected to an upwardly directed opening of the housing and having an outlet connected to a sanitary drain, a greasy water outlet extending to an oil/grease separator from the housing above the macerating pump inlet to enable oil/grease and water to exit the housing, means for maintaining the flow of oil/grease and water through the greasy water outlet, and means for effecting the operation of the macerating pump.

\* \* \* \* \*